(12) United States Patent
Block (10) Patent No.: US 6,448,732 B1
(45) Date of Patent: Sep. 10, 2002

(54) DUAL MODE PORTABLE SUCTION CLEANER

(75) Inventor: Thomas S. Block, Muskegon, MI (US)

(73) Assignee: Pacific Steamex Cleaning Systems, Inc., Muskegon, MI (US)

( * ) Notice: Subject to any disclaimer, the term of this patent is extended or adjusted under 35 U.S.C. 154(b) by 2 days.

(21) Appl. No.: 09/636,162

(22) Filed: Aug. 10, 2000

Related U.S. Application Data
(60) Provisional application No. 60/147,992, filed on Aug. 10, 1999.

(51) Int. Cl.[7] .............................................. G05B 11/01
(52) U.S. Cl. ...................... 318/635; 318/650; 318/139; 318/245; 318/441; 318/442; 15/339; 15/DIG. 1
(58) Field of Search ................................. 318/635, 650, 318/107, 106, 139, 245, 441, 442; 323/282; 15/339, DIG. 1

(56) References Cited

U.S. PATENT DOCUMENTS

| | | |
|---|---|---|
| 1,255,662 A | 2/1918 | Sullivan |
| 3,267,510 A | 8/1966 | Cote |
| 3,757,194 A | 9/1973 | Weber et al. |
| 4,541,142 A | 9/1985 | Pudwill |
| 4,570,286 A | 2/1986 | Ross |
| 4,574,419 A | 3/1986 | Lex |
| 4,748,712 A | 6/1988 | DiGiovanni |
| 4,835,409 A | 5/1989 | Bhagwat et al. |
| 4,918,857 A | 4/1990 | Wate et al. |
| 4,944,065 A | 7/1990 | Svanberg et al. |
| 5,040,263 A | 8/1991 | Gühne et al. |
| 5,440,216 A * | 8/1995 | Kim ........................... 318/587 |
| 6,307,358 B1 * | 10/2001 | Conrad ....................... 323/282 |

FOREIGN PATENT DOCUMENTS

DE          35 43 376 A1    6/1987    ............. A47L/5/32

* cited by examiner

Primary Examiner—Karen Masih
(74) Attorney, Agent, or Firm—Van Dyke, Gardner, Linn & Burkhart, LLP (57) ABSTRACT

A vacuum cleaner operates via power supplied from either an on-board battery or an AC power outlet. When the vacuum cleaner is operating by using the battery a controller monitors the voltage level in the battery and automatically shuts down the vacuum cleaner when the battery voltage has decreased below a preset level. This prevents a full drainage of the battery and increases its longevity. The controller that monitors the battery voltage level can be used with batteries of different voltages. The controller automatically determines which type of battery is being used and shuts down power to the vacuum cleaner motor after the appropriate amount of battery drainage.

17 Claims, 6 Drawing Sheets

DUAL MODE PORTABLE SUCTION CLEANER

This application claims priority to U.S. Provisional Application Ser. No. 60/147,992 filed on Aug. 10, 1999, and entitled DUAL MODE, DUAL VOLTAGE PORTABLE SUCTION CLEANER.

BACKGROUND OF THE INVENTION

1. Field of the Invention

The invention relates to a portable suction cleaner that is capable of operating from alternating current (AC) from a fixed power source or from direct current (DC) provided by an onboard battery.

2. Related Art

U.S. Pat. No. 4,835,409, issued May 30, 1989, to Bhagwat et al. discloses a corded or cordless dual mode power-operated vacuum cleaner that typical operates in the range of 3–48 volts DC. The AC input source current is converted to a relatively high DC current, chopped and used to charge the on-board batteries. The input voltage to the Bhagwat motor is constant regardless of the source of power. Bhagwat '409, as well as other similar dual mode vacuum cleaners, presents a compromise between available power in a corded mode, and the duration of operation or battery life of the cordless mode. In many applications, it would be desirable to enjoy a longer battery life, and it would be acceptable to have a slightly lower suction power to achieve this extended battery life. On the other hand, there are instances where a higher suction power is necessary. It would thus be desirable to have that power available in a corded mode, utilizing the same portable suction cleaner.

In vacuum cleaners that are powered by a battery, the weight of the vacuum cleaner is often an important consideration to the customer. Reducing the weight of the vacuum cleaner, however, is often not possible without suffering from a corresponding decrease in the suction power of the vacuum cleaner. This is due to the fact that batteries having a higher voltage tend to weigh more than batteries having a lower voltage, all other considerations remaining equal. Manufacturers may therefore offer a range of models to their customers. Some of these models will weigh more, but will incorporate higher power motors and therefore better suction. Others of the models will weigh less but will suffer from reduced suction. In offering such different models to customers in the past, it has been necessary to manufacture different control circuitry for each of the different models. This can add significant cost to the manufacturing and assembly of the different vacuum cleaners.

SUMMARY OF THE INVENTION

According to one aspect of the invention, a power supply is provided for supplying power to a vacuum cleaner. The power supply includes a first and second AC input terminal, a first and second DC input terminal, a switch, and a control circuit. The switch selectively couples either the AC or DC input terminals to a motor. The control circuit monitors the voltage at the first and second DC input terminals when the switch has electrically coupled the first and second DC input terminals to the motor. The control circuit terminates power to the motor when the voltage between the first and second DC input terminals falls beneath a threshold level.

According to another aspect of the invention, a method is provided for controlling the power to a vacuum cleaner motor. The method comprises providing an AC and a DC input, along with providing a switch that alternately electrically couples the AC or DC input to the motor. The method further includes detecting the voltage at the DC input when the DC input is electrically coupled to the motor, comparing the voltage at the DC input to a predetermined threshold level, and terminating the electrical coupling of the DC input to the motor when the DC input falls below the predetermined threshold level.

According to yet another aspect of the present invention, a vacuum cleaner is provided that includes a housing having an intake, and impeller, and a motor for operating the impeller. A battery input is provided for receiving power from a battery, and an AC input is provided for receiving power from an AC power outlet. A switch couples either the battery input or the AC input to a motor. A controller monitors the voltage level at the battery input when the switch is coupled with the battery input to the motor. The controller decouples the battery input from the motor when the voltage level at the battery input falls below a predetermined threshold level.

According to yet another aspect of the present invention, a circuit board for controlling a vacuum cleaner is provided. The circuit board includes a battery input, a motor terminal, a controller, and at least one electrical junction on the circuit board. The controller selectively supplies power from the battery input to the motor terminal when the battery input has a voltage that exceeds a predetermined threshold value. The controller decouples the battery input from the motor terminal when the battery input voltage falls below the predetermined threshold value. The electrical junction sets the predetermined threshold level at a first value when the junction is closed, and sets the predetermined threshold level at a second value when the electrical junction is open.

A portable corded/cordless suction cleaner according to one embodiment of the inventor has a direct current (DC) motor adapted to operate at two different DC voltages. The suction cleaner has an AC input power cord and also has on board DC batteries. A circuit is connected to the AC power cord, to the batteries and to the DC motor. The circuit converts 120 volts AC to a voltage suitable for the motor in a corded mode when 120 volts AC power is selectively supplied to the circuit and selectively applies that voltage to the DC motor. The circuit selectively applies the voltage from the batteries to the motor in a cordless mode. The circuit further has a manually operated switch for selection of the corded or cordless mode. The circuit detects when the voltage in the batteries has fallen below a threshold and cuts off power to the motor if such a voltage drop has occurred. This increases battery longevity. The suction cleaner has the advantage of extended battery life while in the cordless mode, while still providing a higher level of suction power while operating in the corded mode.

The present invention provides the advantage of having a single controller which accommodates either an AC input or a DC, battery input. When the battery level drops, the controller shuts down the motor indicating that it is time for the battery to be either replaced or recharged. By shutting down the batteries prior to their full depletion, the number of times which the battery can be recharged is increased. The present invention also allows a single controller to accommodate at least two batteries of different voltages. A single controller can therefore be manufactured to accommodate vacuum cleaners having two different types of batteries. This helps reduce the costs associated with manufacturing the vacuum cleaner. Other objects, features, and advantages of the invention will be apparent from the ensuing description in conjunction with the accompanying drawings.

DETAILED DESCRIPTION OF THE PREFERRED EMBODIMENTS

The vacuum cleaner of the present invention operates either by receiving power from an AC power outlet, or via a battery carried with the vacuum cleaner. For some models of vacuum cleaners, the battery may be a higher voltage battery, such as a 36 volt battery. For other models of vacuum cleaners, the battery may be a lower voltage battery, such as a 24 volt battery. The vacuum cleaner models that use a higher voltage battery have the advantage of providing better suction, but have the disadvantage of weighing more. The vacuum cleaner models that use a lower voltage battery have the advantage of weighing less, but have lower suction. For example, a vacuum cleaner that uses a 36 volt battery will weigh approximately 2 lbs. more than a comparable model vacuum cleaner that uses a 24 volt battery. The present invention provides a single controller that is used in either the higher voltage vacuum cleaner models or the lower voltage vacuum cleaner models. The manufacturer of the vacuum cleaner therefore only needs to manufacture a single controller while still being able to offer the customer the option of a higher or lower voltage, battery powered vacuum cleaner. Regardless of the voltage level of the battery, the single controller also allows the vacuum cleaner to be operated by an AC power outlet. The controller also provides an important "shut off" function, which preserves the life of the batteries by cutting off their power after they have drained to a certain extent, as will be described more fully herein.

Figure 1:
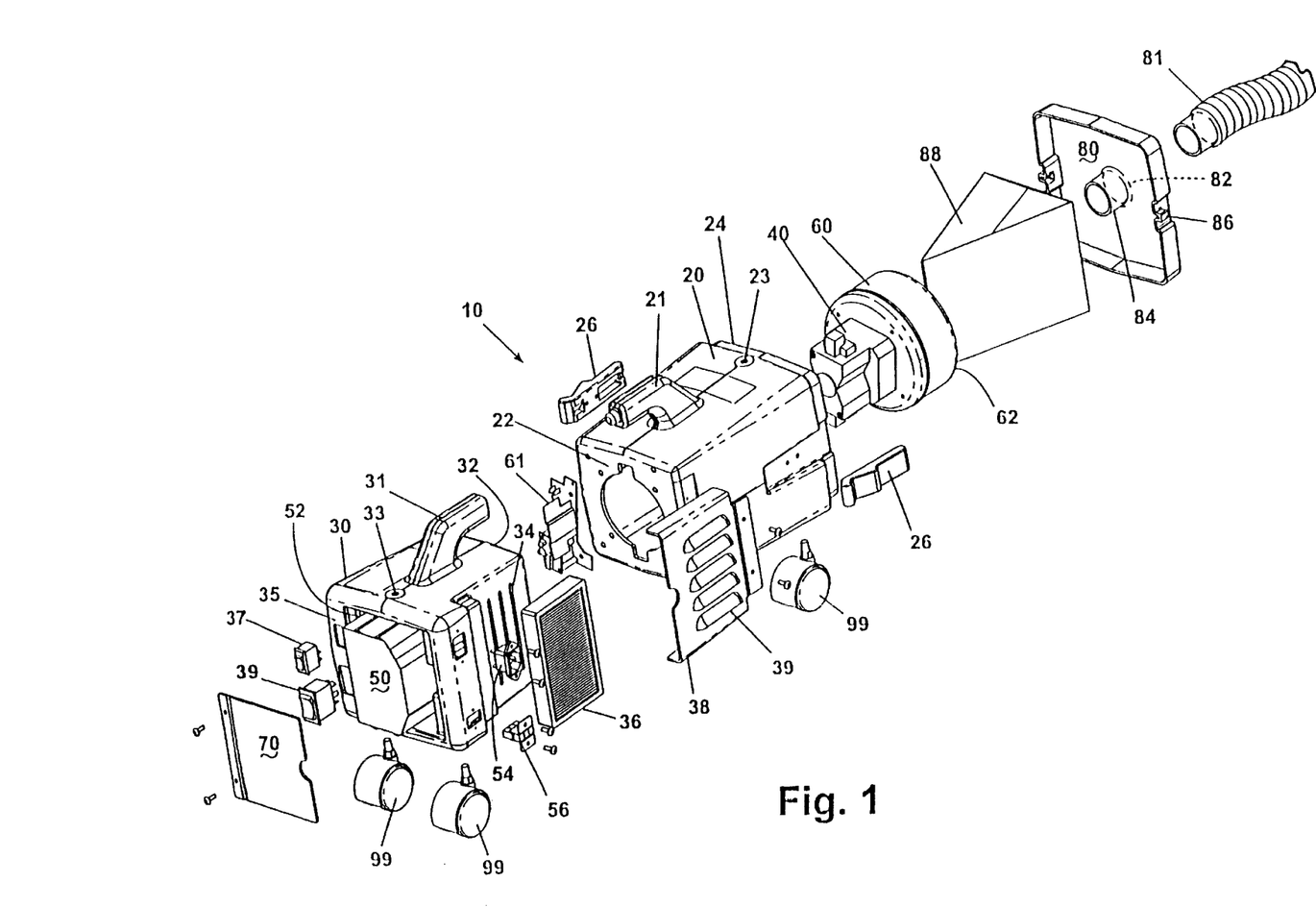
FIG. 1 is an exploded perspective view of the portable suction cleaner according to the invention.
Figure 2:
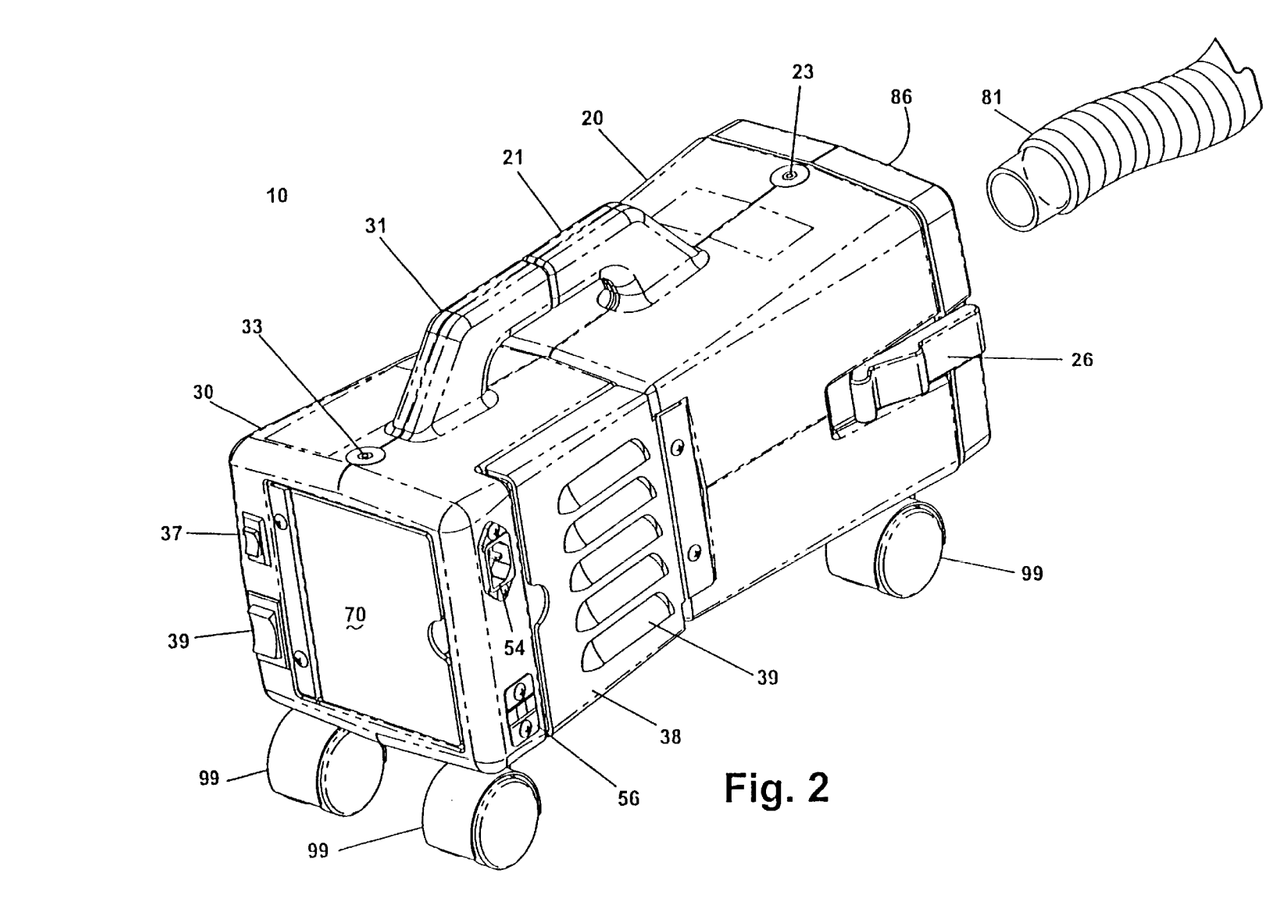
FIG. 2 is a perspective view of the assembled suction cleaner according to FIG. 1.
Figure 3:
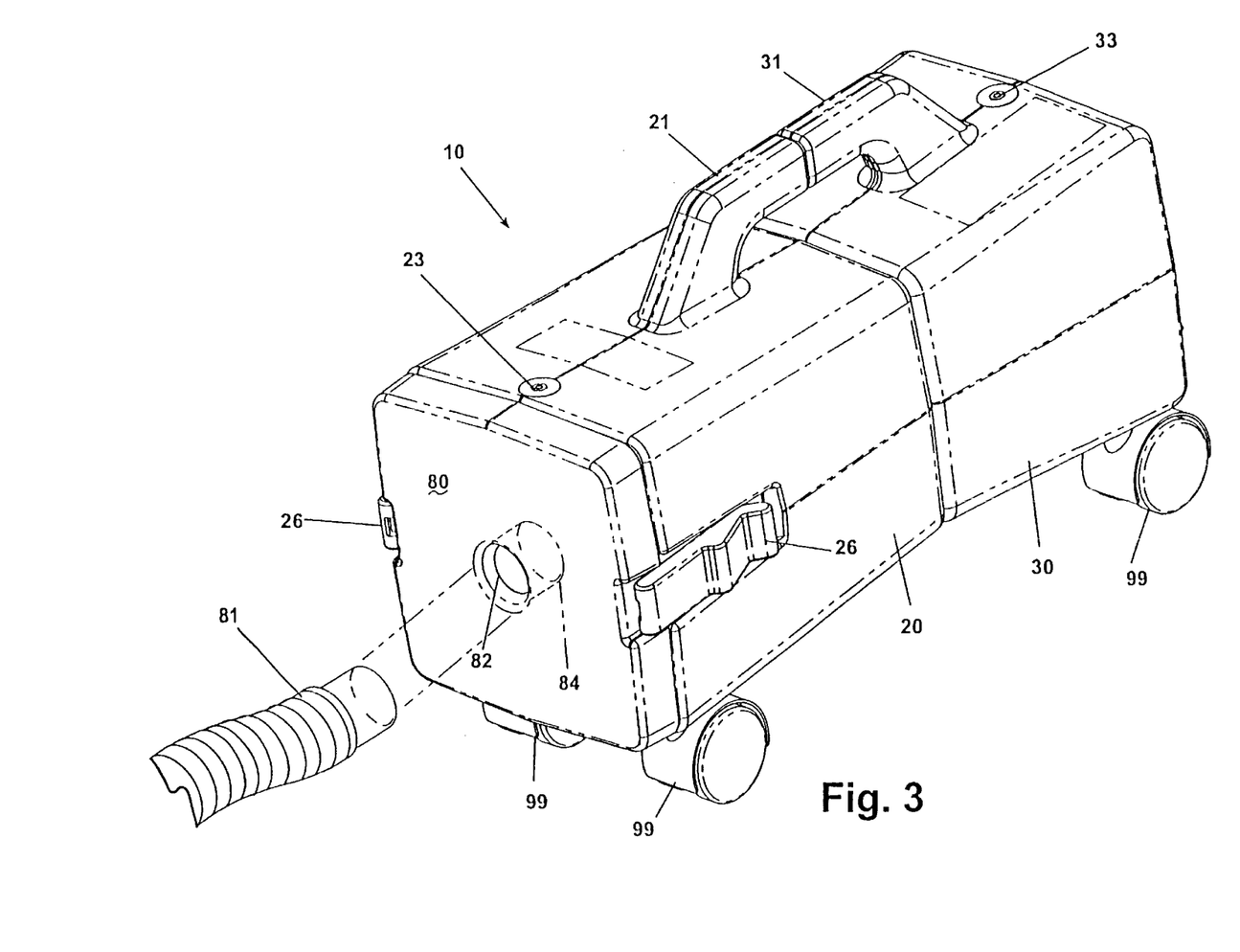
FIG. 3 is a reverse perspective view of the assembled suction cleaner according to FIG. 1.

Referring to FIGS. 1–3, a portable suction cleaner 10 comprises a primary housing 20 and a secondary housing 30. The housings 20, 30 are generally rectangular in cross-section. The primary housing 20 comprises a longitudinal passage in which is mounted an electric motor 40, which rotatably drives an impeller 60. The electric motor 40 is mounted in the internal end 22 of the primary housing. The impeller 60 which remains on the interior of the primary housing 20 forms the internal end of the vacuum bag compartment 24. The impeller 60 is enclosed by an impeller intake filter 62, which filters particles from the air that is drawn into the vacuum housing. The vacuum bag compartment 24 is defined by the four walls of the primary housing 20, the impeller intake filter 62, and the vacuum bag compartment cover 80. The vacuum bag compartment cover 80 has a central aperture 82 adapted to receive a hose 81 from the exterior of the housing. Projecting inwardly from the aperture 82 is a vacuum bag adapter 84. The vacuum bag adapter 84 is adapted to receive a vacuum bag 88 which generally has a circular opening for the introduction of debris collected in the hose 81. The cover 80 is secured to the primary housing 20 by latches 26 which are attached to the sides of the primary housing 20 and close over latching studs 86 on each side of the cover 80. The body of the electric motor 40 passes through the internal end 22 of the primary housing 20 and is mounted predominantly in the motor cavity 32 located in the secondary housing 30.

The secondary housing 30 contains the motor cavity 32. The motor cavity 32 also serves as an exhaust plenum for air drawn in by the electric motor and impeller 40, 60. Air drawn into the exhaust plenum is exhausted through the primary exhaust vents 34 and through a High Efficiency Particulate Air (HEPA) or 30 pores per inch polyfoam final stage filter 36. The filter 36 is held in place by a filter cover 38 which has final exhaust vents 39, which allow air to pass out of the secondary housing 30.

The remainder of the secondary housing 30 comprises the battery compartment 52, which houses the battery pack 50, and the associated electrical controller 61 that regulates the supply of power to the electric motor 40.

The battery pack 50 is held in the battery compartment 52 by a battery compartment cover 70. The battery compartment cover 70 is located on the external end 35 of the secondary housing 30. Also located on the external end 35 of the secondary housing 30 are two switches 37 and 39.

Adjacent to the filter 36 and the filter cover 38, are the AC cord receptacle 54 and the battery charger power receptacle 56. The AC cord receptacle 54 is adapted to receive an AC power cord 55 for supplying AC power to the suction cleaner 10. The battery charger receptacle 56 is adapted to electrically connect to a battery charger 57 for supplying a battery charging current.

On an upper side of the primary housing 20 lies a first handle section 21. Likewise, on an upper surface of the secondary housing 30 lies second handle section 31. The handle sections 21, 31 are adapted to slidably connect upon assembly of the housings 20, 30. On the lower side of the primary housing 20 and the secondary housing 30 lie a plurality of optional casters, wheels, or other equivalent roller means 99 adapted to movably support the portable suction cleaner 10 on a surface. The handle sections 21, 31 may be supplemented, or replaced, by other carrying means, such as a strap for carrying the suction cleaner 10 over the shoulder of the operator.

In operation, an electric current is supplied to the electric motor 40 which drives the impeller 60 to create a suction within the vacuum bag compartment 24. Outside air drawn through the vacuum hose receptacle 82, through the vacuum bag adapted 84, and into the vacuum bag 88 where dirt or other particles are deposited. Cleaner air passes through the body of the vacuum bag 88 and is drawn through the impeller filter 62 and impeller 60 and into the motor cavity 32, from whence it is exhausted through the filter 36 and out the final exhaust vents 39.

The electric motor 40 is adapted to operate at a given maximum direct current voltage, such as 36 VDC. While operating in the corded mode, a DC voltage, up to the maximum voltage, such as 36 volts DC is supplied to the electric motor 40. While operating in the cordless mode, the same or a different voltage is supplied to the electric motor 40 from the internal battery pack 50, which is carried in the battery compartment 52. The voltage of the battery is determined at the time of the manufacture of the vacuum cleaner. If the customer wants a lighter vacuum cleaner, a lower voltage battery, such as a 24 volt battery, will be used. If the customer doesn't mind a higher weight, a higher voltage battery will be used, such as a 36 volt battery. Regardless of the customer's choice of batteries, a single control circuit, or controller 61, is used, with either the lower or the higher voltage battery. In addition to controlling the vacuum cleaner, controller 61 is designed to shut off power to the„ motor after the battery has drained to a certain predetermined level. By shutting off the power prior to completely draining the battery, the number of times the battery can be effectively recharged is increased. While the precise cutoff level can be varied, controller 61 in the preferred embodiment shuts off power to the motor when the voltage is the battery has dropped by approximately 5–6 volts. Specifically, if a 36 volt battery is used, controller 61 shuts down the vacuum motor when the voltage has dropped to 29.7 volts. If a 24 volt battery is used, controller 61 shuts down the vacuum motor when the battery level drops to 19.7 volts. The choice of power supply is selectable by switch 39, which is typically an on-off-on rocker switch. Switch 39 determines whether the vacuum cleaner will operate from a battery or an AC power outlet.

Figure 4:
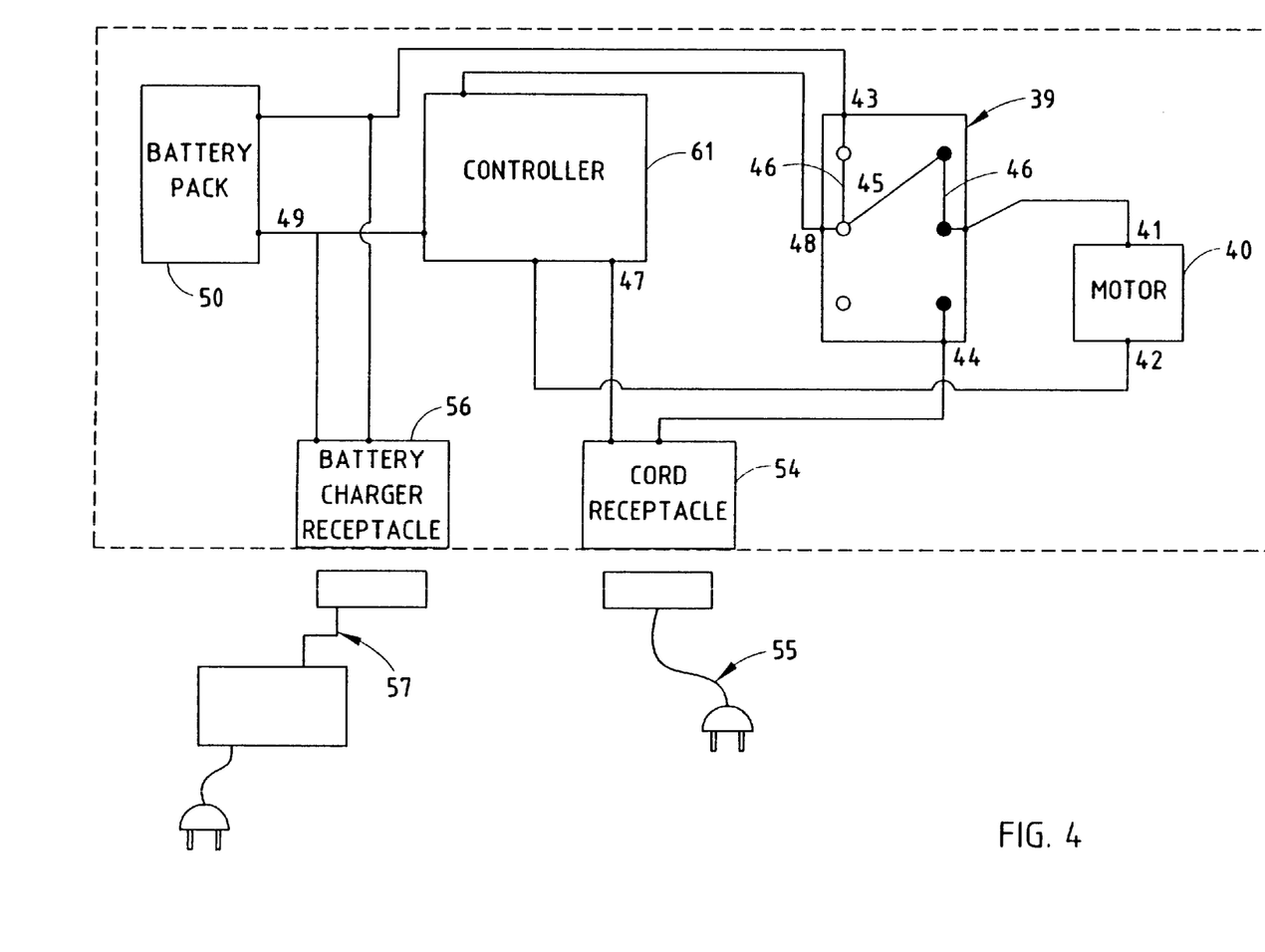
FIG. 4 is an electric schematic diagram of the suction cleaner according to the invention.

Referring now to FIG. 4, an electrical schematic diagram shows an arrangement for selectively supplying the electric motor 40 with power from either a battery or an AC outlet. The electric motor 40 is electrically connected to the source of power through the switch 39 The on-off-on rocker switch 39 selectively connects the positive terminal 41 of the electric motor 40 to battery positive terminal 43 or AC positive terminal 44. A negative terminal 42 of the electric motor 40 is electrically connected to a negative terminal 47, 49 through the controller 61.

The switch 39, in a first "on" position of FIG. 4, shows the terminal 41 electrically connected to battery positive terminal 43 through a first switch contact 46, a jumper 45, and a second stitch contact 46'. In this configuration, the motor 40 would be operating from the internal rechargeable battery pack 50. The battery positive terminal 43 in this configuration, is also electrically connected to the controller input terminal 48, which allows the output voltage of the battery to be monitored by the controller 61. The controller 61, by monitoring the output voltage of the battery 50, protects the battery pack 50 against damage which would result from the output voltage decreasing to an undesirable low level. This would be effected by removing the electrical connection between the negative terminal 42 of the electric motor 40 and the battery negative terminal 49, of the battery pack 50, as it passes through the controller 61. When the switch 39 is placed in its center, or "off," position, the terminals 41 and 48 are each electrically isolated from the terminals 43 and 44, effectively electrically isolating both the positive terminal 41 of the electric motor 40, and the battery positive terminal 43 of the battery pack 50.

The switch 39 may be placed in a second "on" position. In this second "on" position, the positive terminal 41 of the electric motor 40 is electrically connected through second switch contact 46' to the positive terminal 44 of an AC power source. The negative terminal 42 of the electric motor 40 is electrically connected to the negative terminal 47 of the AC power source through the controller 61. In this configuration, a rectifier circuit within the controller 61 converts a standard 120 volt alternating current to the rated maximum direct current voltage of the electric motor 40, such as 36 volts DC. The terminals 44 and 47 are electrically connected to an AC cord receptacle 54. An AC cord 55 is mechanically and electrically connected to the AC cord receptacle 54 to provide alternating current from a standard fixed source. The terminals 43 and 49 are electrically connected to a battery charger power receptacle 56. The receptacle 56 is adapted to mechanically and electrically connect to an external battery charger 57 which provides a recharging current for the battery pack 50.

Figure 5:
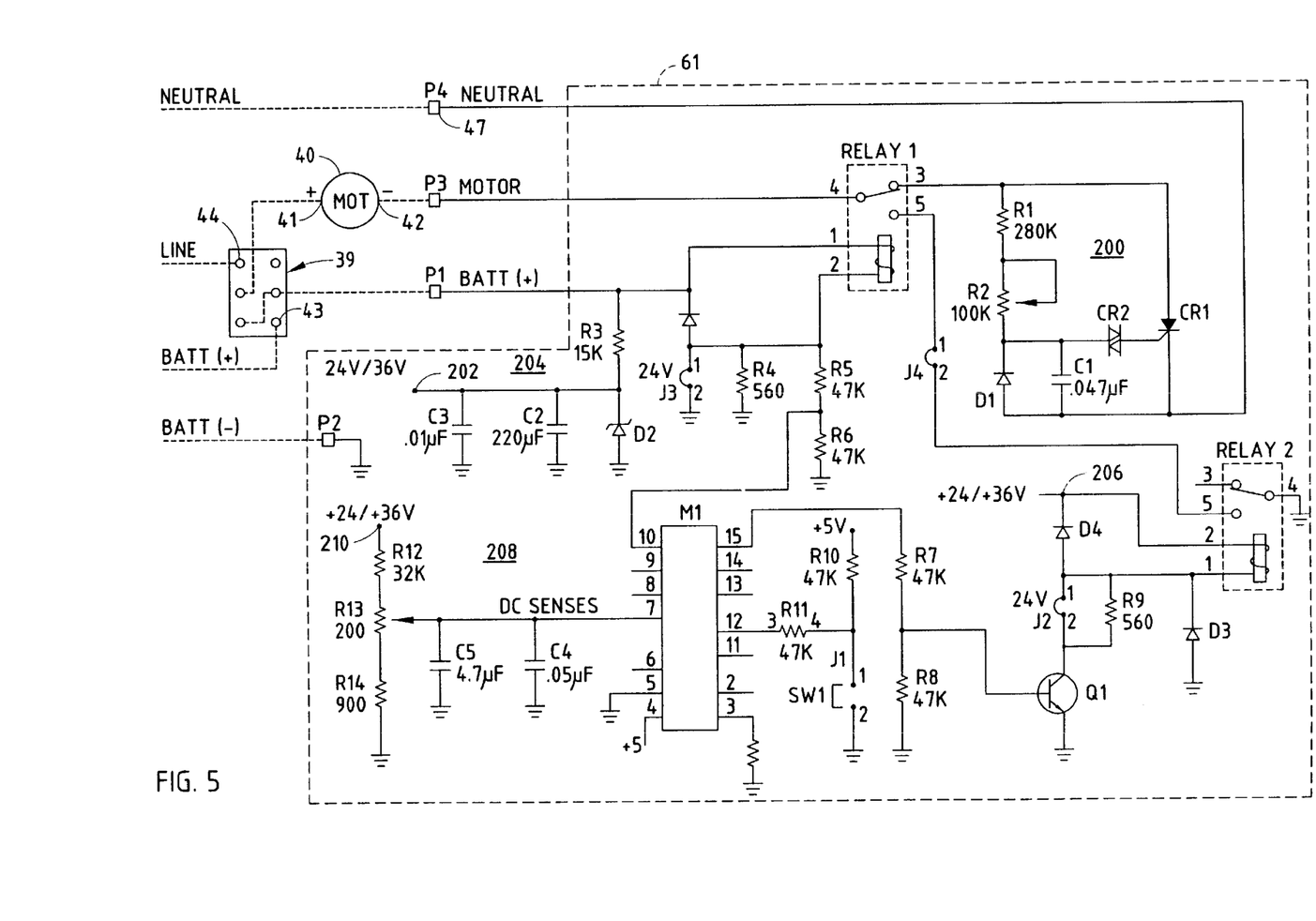
FIG. 5 is an electrical schematic of the controller of FIG. 4.

A detailed schematic of one embodiment of controller 61 is depicted in FIG. 5. In brief overview, controller 61 provides two functions: (1) it allows motor 40 to be powered either by an AC outlet or a DC battery, and (2) when a battery is being used, it shuts off motor 40 when the voltage level in the battery has decreased below a predetermined threshold level due to drainage of the battery. Switch 39 determines whether power will be supplied to motor 40 via a battery or an AC outlet. In the illustrated schematic, switch 39 is in a position such that motor 40 receives its power from a battery. In order for motor 40 to be operated by an AC power outlet, switch 39 is moved upwardly to thereby bring AC positive terminal 44 into electrical coupling with positive terminal 41 of motor 40. When switch 39 is in the AC power position, the 120-volt AC power is both rectified and converted to a suitable voltage level via rectifier circuit 200. Rectifier circuit 200 includes resistors R1 and R2, diode D1, capacitor C1, back-to-back diode CR2, and silicon controlled rectifier CR1. Rectifier circuit 200 both rectifies the AC line current from AC to DC and further limits the voltage from approximately 120 volts to the proper voltage for the motor. In the preferred embodiment, motor 40 operates at 36 volts. Rectifier circuit 200 chops the AC voltage down to a voltage having an average value of 36 volts.

When switch 39 is set to allow motor 40 to be operated via battery power, the positive terminal 43 in the battery is coupled to both the positive terminal 41 of motor 40 and terminal P1 depicted in FIG. 5. Electrically coupled to terminal P1 is a 5-volt power supply circuit 204. Power supply circuit 204 includes resistor R3, zener diode D2 and capacitors C2 and C3. Power supply circuit 204 takes the incoming battery voltage and converts it to 5 volts, which is used to power microprocessor M1, as will be discussed more fully herein. Power supply circuit 204 produces an output of 5 volts at terminal 202 which is coupled to pin 4 of microprocessor M1 and thereby powers microprocessor M1.

Terminal P1 is also electrically coupled to a relay 1. When a battery is connected to terminal P1, relay 1 is activated such that terminal 4 and terminal 5 of relay 1 are electrically coupled. The battery current flowing out of terminal 2 of relay 1 will then pass either directly to ground via junction J3, or will be partially input into pin 10 of microprocessor M1, depending upon whether or not junction J3 is open or closed. If the particular vacuum cleaner model being manufactured is to utilize a 36 volt battery, junction J3 is physically snipped such that there is an open circuit between terminals 1 and 2 of junction J3. The direct battery current exiting terminal 2 of relay 1 will therefore pass through resistors R4–R6, and will provide a high signal at pin 10 of microprocessor 1. When the signal to pin 10 is high, microprocessor M1 knows that a 36 volt battery is present. If a 24 volt battery is being used, the junction J3 remains intact such that current can flow directly from pin 1 to pin 2 of junction J3. This direct path to ground keeps pin 10 of microprocessor M1 at a voltage low level, thereby indicating that a 24 volt battery is present.

Microprocessor M1 controls the operation of motor 40 when a battery is present via relay 2. Microprocessor M1 controls the operation of relay 2 via pin 15 and transistor Q1. When pin 15 outputs a voltage high signal, transistor Q1 is turned on. When transistor Q1 is turned on, current flows from terminal 206 through relay 2 and on through transistor Q1 to ground. Terminal 206 is connected directly to the positive terminal of the battery. In the currently preferred embodiment terminal 206 will therefore have either a positive 36 or 24 volts. If a 36 volt battery is to be used, junction J2 is physically cut, thereby creating an open circuit between terminals 1 and 2 of junction J2. Current from terminal 206 must therefore flow through resistor R9 prior to passing through transistor Q1. Resistor R9 helps limit the current flowing to transistor Q1 and thereby prevents it from burning out. When a 24 volt battery is to be used with this circuit, junction J2 is left intact such that there is a closed circuit between terminals 1 and 2 of junction J2. The current from terminal 206 thereby bypasses resistor R9 and flows directly into transistor Q1. Regardless of whether a 24 or 36 volt battery is used, the activation of transistor Q1 causes relay 2 to be activated, thereby electrically coupling terminals 5 and 4 are coupled together in relay 2. When terminals 5 and 4 are coupled together in relay 2, electrical current is allowed to flow through motor 40 and directly to ground. To stop motor 40, microprocessor M1 outputs a voltage low signal at pin 15. This deactivates transistor Q1 and no current flows from terminal 206 through relay 2. This interrupts the path of the current for motor 40 to ground and thereby shuts the motor off.

In the illustrated embodiment, controller 61 includes a switch SW1 which is activated by a user to turn on or off motor 40. When switch SW1 is in an "on" position, this is detected by pin 12 of microprocessor M1. Microprocessor M1 then turns on the motor by outputting a voltage high signal at pin 15, as explained previously.

Microprocessor M1 also senses the voltage level of the battery via sensing circuit 208, which is input into pin 7 of microprocessor M1. Sensing circuit 208 is electrically coupled at terminal 210 to the positive terminal of the battery. Terminal 210 is therefore either 36 or 24 volts in the currently preferred embodiment. Sensing circuit 208 allows microprocessor M1 to determine whether the voltage level in the battery has decreased below a predetermined threshold level. If it has, microprocessor M1 shuts off motor 40. By shutting off motor 40 when this threshold has been reached, microprocessor M1 prevents the batteries from being excessively drained, which thereby increases the life of the batteries. Sensing circuit 208 includes a variable resistor R13 which allows some fine tune adjustments to be made to the threshold level at which microprocessor M1 will cut off power to motor 40. The primary determinant as to when power is cut off from motor 40 due to a low voltage battery condition is the software programming of microprocessor M1. However, variable resistor R13 allows for this programmed value to be physically adjusted by approximately plus or minus 10%.

Figure 6:
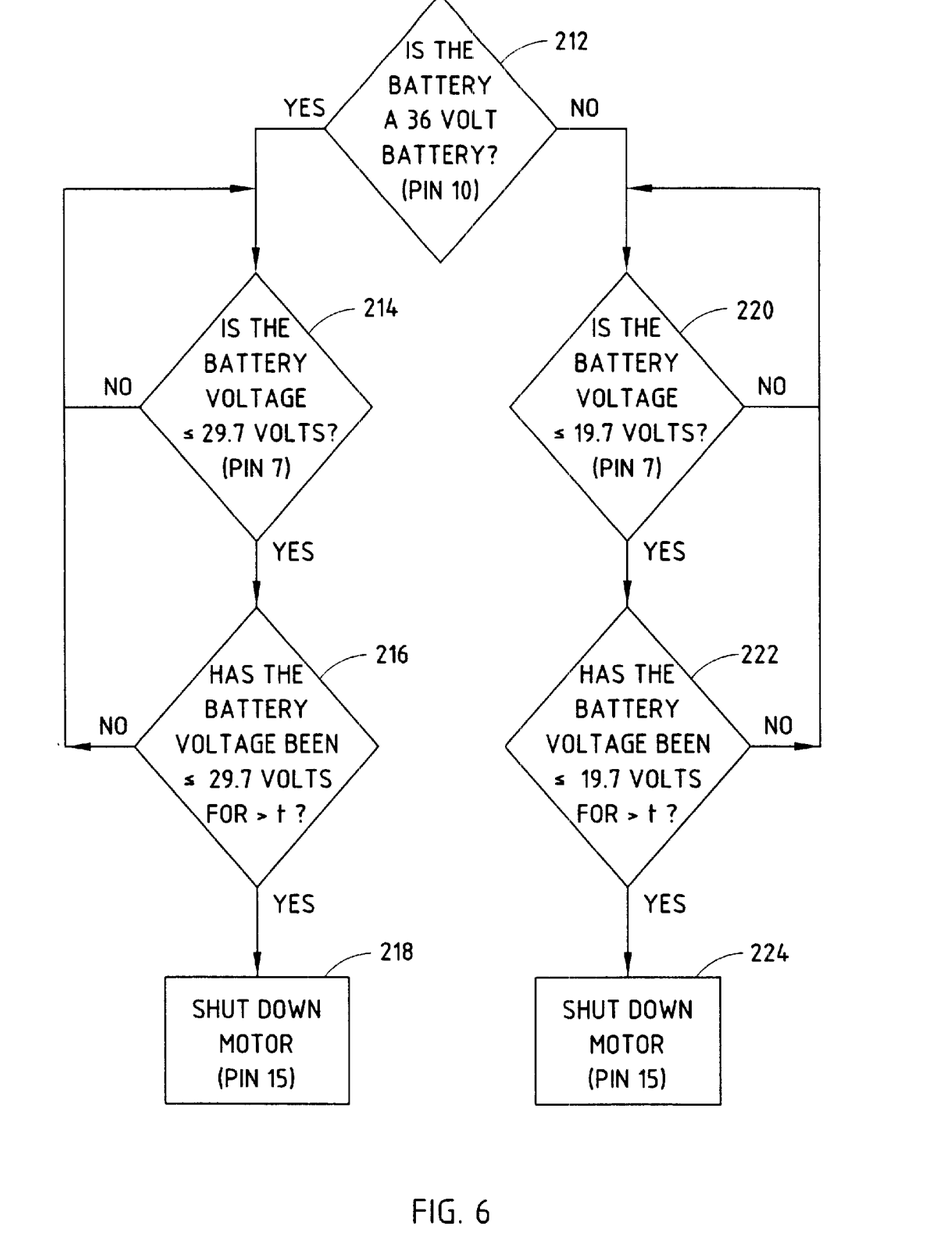
FIG. 6 is a flow chart illustrating the operation of a microprocessor in FIG. 5.

The control logic followed by microprocessor M1 is depicted in flowchart format in FIG. 6. When a battery is connected to controller 61, microprocessor M1 determines at step 212 whether the battery is 24 or 36 volts. This is determined via pin 10 of microprocessor 212. If pin 10 has a high signal, a 36 volt battery is being used. If pin 10 has a low signal, a 24 volt battery is being used. If a 24 volt battery is being used, microprocessor M1 determines at step 214 whether the current has been drained out of the battery such that the voltage of the battery is less than 19.7 volts. If the voltage is not decreased to 19.7 volts or less, microprocessor M1 continues to allow power to be delivered to motor 40 so long as switch SW1 is activated. Microprocessor M1 repeatedly checks the voltage level of the battery to see if it is decreased to 19.7 volts or less. If it has decreased to 19.7 volts or less, microprocessor M1 measures at step 216 the length of time during which the voltage is less than or equal to 19.7 volts. If this amount of time exceeds a preset amount of time, microprocessor M1 shuts down motor 40 via pin 15 at step 218. Microprocessor M1 will not allow power to be supplied to motor 40 thereafter until switch SW1 is then switched off. If microprocessor M1 determines at step 212 that a 36 volt battery is present, control passes to step 220. At step 220, microprocessor M1 determines whether the battery has been drained such that its voltage has decreased to 29.7 volts or less. If this has not occurred, microprocessor M1 continues to check this level until such a low voltage condition is detected. When such a low voltage condition is detected, microprocessor M1 determines at step 222 whether the low voltage condition has been present for a preset amount of time. If it has, microprocessor M2 shuts down motor 40 at step 224 and keeps motor 40 shut down until switch SW1 is switched off. If the low voltage condition has not been present for the preset amount of time, control passes back to step 220 and repeats the general process described herein.

In the currently preferred embodiment, microprocessor M1 must detect a low voltage battery condition for a preset amount of time that is on the order of 30 seconds before it will shut down motor 40. This 30-seond threshold is used for both a 24 volt battery and a 36 volt battery. The reason for this preset time period is to avoid prematurely shutting down motor 40. As the load conditions on motor 40 change, the voltage levels of the battery can fluctuate. In order to avoid shutting down the motor 40 due to a temporary fluctuation, microprocessor M1 waits approximately 30 seconds to see if the low voltage condition prevails for this long. If it does, the assumption is that it is not a temporary low voltage condition, but rather a low voltage condition due to the battery having been drained. In the currently preferred embodiment, microprocessor M1 is a microprocessor manufactured by STMicroelectronics of France under model no. ST62T00CB6/HWD.

In summary, controller 61 can be used with either a 24 volt or 36 volt battery. If it is determined that it will be used with a 36 volt battery, junctions J2 and J3 are physically cut on the circuit board containing controller 61. If a 24 volt battery is to be used, junctions J2 and J3 are left intact. Based on this physical snipping of junctions J2 and J3, controller 61 is able to determine which voltage battery is present, and automatically shut down motor 40 at the appropriate time when the battery is drained to a predetermined level. It should be understood that in addition to cuttable junctions, the rated voltage of the battery could be indicated by a jumper, a toggle switch, a dip switch, an electronic memory device such as an EEPROM, or the like.

A manufacturer thereby has to only produce a single controller for at least two different models of vacuum cleaner. If a customer orders a high voltage vacuum cleaner, such as a 36 volt vacuum cleaner, controller 61 is used in the vacuum cleaner with junctions J2 and J3 physically cut. If a customer orders a low voltage vacuum cleaner, such as a 24 volt vacuum cleaner, controller 61 is still used but junctions J2 and J3 remain intact. In either model, controller 61 will preserve the life of the battery by automatically shutting down the motor when the battery has drained to a low voltage condition.

While the present invention has been described in terms of the preferred embodiments depicted in the drawings and discussed in the above specification it will be understood by one skilled in the art that the present invention is not limited to these particular preferred embodiments, but includes any and all such modifications that are within the spirit and scope of the present invention as defined in the appended claims.

The embodiments of the present invention in which an exclusive property or privilege is claimed are defined as follows:

1. A vacuum cleaner comprising:

a motor;

an AC supply input;

a DC supply input;

a switch that selectively couples either the AC or DC input to said motor to thereby deliver power to said motor; and a control adapted for operating said motor from at least two different rated batteries connected with said DC supply input, said control monitoring the voltage at said DC input when said switch has electrically coupled said DC input to said motor, said control terminating power to the motor when the voltage at said DC input falls beneath a threshold level, said control establishing said threshold as a function of which rated battery is connected to said DC input.

2. The vacuum cleaner of claim 1 wherein said control only terminates power to the motor when the voltage at said DC input has dropped below the threshold level for at least a predetermined amount of time.

3. The vacuum cleaner of claim 2 wherein said predetermined amount of time is greater than five seconds.

4. The vacuum cleaner of claim 1 including a battery selection input to indicate which rated voltage battery is connected to said DC input.

5. The vacuum cleaner of claim 4 wherein said battery selection input comprises cuttable conductors.

6. The vacuum cleaner of claim 1 further including a voltage converter that converts the voltage at said AC input supply to a different voltage level.

7. The vacuum cleaner of claim 6 further including a rectifier that converts AC supplied to said AC input to DC input.

8. The vacuum cleaner of claim 4 wherein said battery selection input includes at least one electrical junction which sets said threshold level at a first value when said junction is closed, and sets said threshold level at a second value when said junction is open.

9. A method of controlling power to a vacuum cleaner motor comprising:

providing an AC input;

providing a DC input;

providing a switch that alternately electrically couples said AC or DC input to the motor;

detecting the voltage at the DC input when the DC input is electrically coupled to the motor;

comparing the voltage at the DC input to a predetermined threshold level; and terminating the electrical coupling of said DC input to the motor when the DC input falls below the predetermined threshold level.

10. The method of claim 9 further including:

detecting whether a battery having a first voltage or a battery having a second voltage is electrically coupled to said DC input;

setting said predetermined threshold at a first value if said battery has a first voltage; and setting said predetermined threshold at a second value if said battery has a second voltage.

11. The method of claim 10 further including providing a rectifier that rectifies any alternating current supplied to said AC input to direct current.

12. The method of claim 10 wherein said setting said predetermined threshold at a first value further includes providing at least one electrical junction and physically cutting said electrical junction.

13. A vacuum cleaner comprising:

a housing defining an intake;

an impeller;

a motor for operating said impeller such that air is drawn into said housing through said intake when said impeller operates;

a battery input for receiving power from a battery;

an AC input for receiving power from a AC power outlet;

a switch for coupling either said battery input or said AC input to said motor;

and a controller which monitors the voltage level at said battery input when said switch has coupled said battery input to said motor, said controller decoupling said battery input from said motor when said voltage level falls below a predetermined threshold level.

14. The vacuum cleaner of claim 13 further including at least one electrical junction in said control which sets said predetermined threshold level, said electrical junction setting said predetermined threshold level at a first value when said electrical junction is open, said electrical junction setting said predetermined threshold level at a second level when said electrical junction is closed.

15. The vacuum cleaner of claim 13 further including a microprocessor which measures the length of time at which the voltage level at said battery input falls below said predetermined threshold level, said microprocessor programmed to decouple said battery input from said motor only when said voltage level falls below said predetermined threshold level for a set length of time.

16. The vacuum cleaner of claim 13 further including a voltage converter that converts the voltage level at said AC input to a different voltage suitable for powering said motor.

17. The vacuum cleaner of claim 16 further including a relay which selectively decouples said voltage converter from said motor.

* * * * *